Oct. 5, 1965 A. DRITZ 3,209,422

FASTENING DEVICE

Filed Dec. 23, 1963 3 Sheets-Sheet 1

Oct. 5, 1965   A. DRITZ   3,209,422
FASTENING DEVICE
Filed Dec. 23, 1963   3 Sheets-Sheet 2
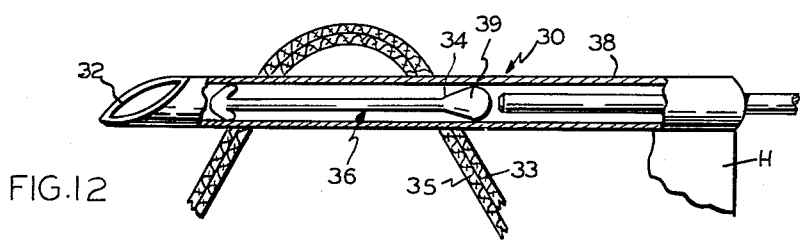
FIG.12
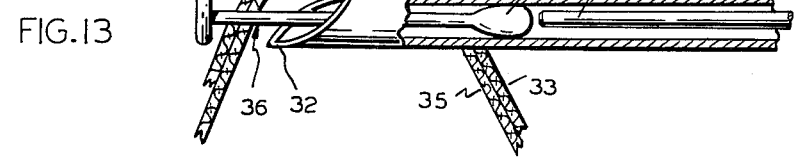
FIG.13
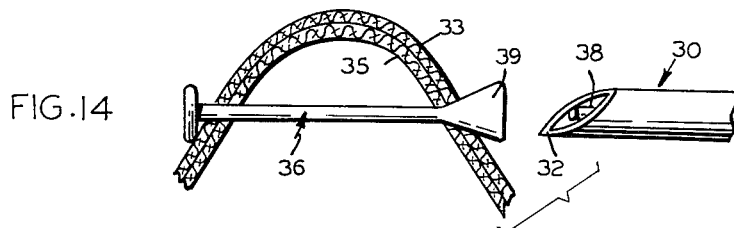
FIG.14
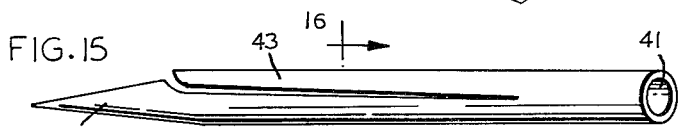
FIG.15
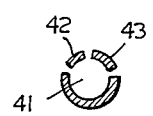
FIG.16
FIG.17
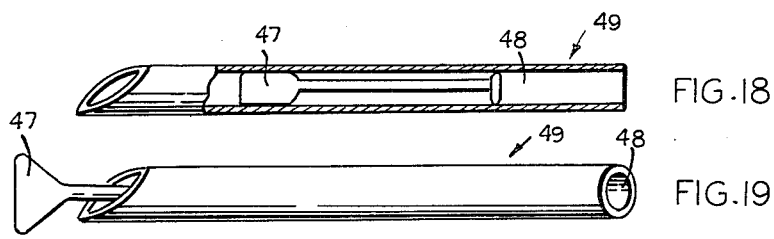
FIG.18
FIG.19

Oct. 5, 1965   A. DRITZ   3,209,422
FASTENING DEVICE

Filed Dec. 23, 1963   3 Sheets-Sheet 3

United States Patent Office 3,209,422
Patented Oct. 5, 1965

3,209,422
FASTENING DEVICE
Arthur Dritz, 171 Beach 125th St.,
Rockaway Park, N.Y.
Filed Dec. 23, 1963, Ser. No. 332,623
13 Claims. (Cl. 24—150)

This is a continuation-in-part of application Serial No. 186,827, filed April 6, 1962, now Patent No. 3,182,879.

This invention generally relates to a novel apparatus and method for temporarily fastening two or more sheets of flexible material together. In one embodiment this invention relates to a device for applying a flexible pin member to two or more layers of material. In another embodiment this invention involves a device for fastening together two or more flexible layers of material with pin members having only blunt ends. This invention involves the use of pin members which are safe to use in that they will not pierce the skin.

The main object of this invention is to provide a device for fastening two or more sheets of flexible material together by means of a pin member having only blunt ends and which can therefore be safely used by humans without the danger of piercing or pricking the skin.

The invention will be illustrated by the following drawings wherein:

FIGURES 12, 13 and 14 are side views (partly in section) of another combination of a pin member and a pin insertion protector, and their manner of use, in accordance with this invention;

FIGURES 15-17 show still another type of pin insertion protector in accordance with this invention, FIGURES 15 and 17 being side perspective views and FIGURE 16 being an end view along 16—16 of FIGURE 15;

FIGURES 18 and 19 are side views (partly in section) showing how a pin member with a compressible head can be used in accordance with this invention;

Considered from one aspect, the present invention involves a device for temporarily fastening at least two sheets of flexible material together comprising in combination:

(A) A blunt-ended pin member which comprises:
(a) A longitudinal shaft portion,
(b) A blunt forward end portion located at one end of said shaft portion,
(c) A blunt rear end portion located at the other end of said shaft portion,
(d) Said blunt forward end portion and said blunt rear end portion each having a maximum diameter which is more than 10% larger than the minimum diameter of said shaft portion, said blunt end being tapered in a rearward direction, (B) At least one of said blunt end portions being temporarily housed within a pin insertion protector, (C) Said pin insertion protector comprising:
(a) An elongated member having a recessed portion that is large enough to receive at least one end of said blunt-ended pin member,
(b) The forward end of said elongated member being pointed so that it can penetrate sheets of flexible material with relatively little resistance, (D) Said blunt-ended pin member being axially slideable within said recessed portion of said pin insertion protector.

Figures 1, 2A, 2B, 2C, 2D:
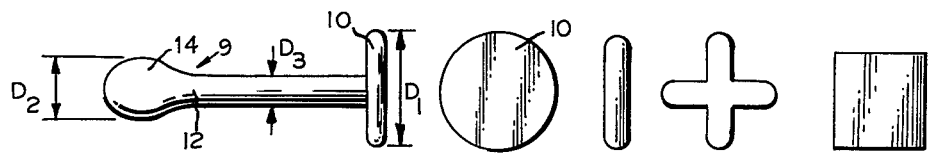
FIGURE 1 is a side view of a pin member in accordance with this invention.
FIGURES 2A, 2B, 2C and 2D are end views showing the possibile shapes which can be used at the ends of pin members in accordance with this invention.
Figures 3, 4, 4A:
FIGURE 3 is a side view of a pin insertion protector.
FIGURE 4 is an end view along 4—4 of FIGURE 3.
FIGURE 4A is an end view of a modified pin insertion member.
Figures 10, 11, 11A:
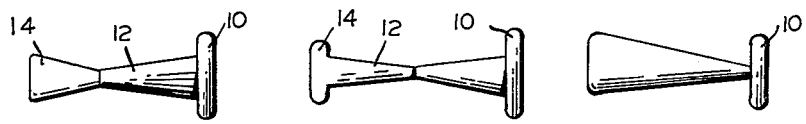
FIGURES 10, 11 and 11A are side views of other embodiments of possible pin members in accordance with this invention.

FIGURE 1 shows a blunt-ended pin member 9 having a longitudinal shaft portion 12, a blunt forward end portion 14 located at one end of said shaft 12 and a blunt rear end portion 10 located at the other end of said shaft 12. The blunt forward end portion 14 and the blunt rear end portion 10 having diameters $D_2$ and $D_1$ which are at least 10% greater and preferably at least 25% greater than the minimum diameter $D_3$ of shaft 12 (most preferably at least 50% greater). The shaft 12 is shown as having a uniform diameter in FIGURE 1, but this diameter would vary progressively from one end to the other, or from both ends toward the middle as shown in FIGURES 10, 11 and 11A.

The forward end portion 14 and the rear end portion 10, when viewed from the end, may have the same shape and configuration or different shapes and configurations. Some of the possible shapes and configurations for the end portions are illustrated (in end view) in FIGURES 2A-2D. FIGURE 2A shows a round shape; FIGURE 2B an oblong shape; FIGURE 2C a cross-like shape and FIGURE 2D a rectangular (or square) shape. Although certain shapes and configurations may be found to be best for certain purposes, the precise shape is generally not critical and can be varied so long as the maximum diameters of the blunt end portions are at least 10% greater (and preferably at least 25% greater) than the the minimum diameter of the shaft. It is also quite important that the blunt ends be tapered toward each other (or toward the middle of the pin member) because it permits the pin members to be withdrawn from catching and tearing threads when the pin member has to be withdrawn from cloth or fabric.

The pin members in accordance with this invention may be made of either metal, rubber or plastic (such as polyethylene, polypropylene, vinyl chloride, etc.) or combinations thereof.

The pin members of this invention are intended to be primarily useful in fastening two or more flexible layers of material together. The invention is especially useful in connection with two or more layers of cloth, but it is also useful for fastening together sheets of paper, a layer of cloth and a sheet of paper, sheets of plastic, sheets of metal foil, etc. In this regard it can be noted that the pin members of this invention are useful for essentially the same purposes that ordinary straight pins and staples are used. However, the pin members of this invention are much safer to use than ordinary straight pins and are not prone to accidental dislodgment.

However, since the pin members of this invention have ends that are blunt (as opposed to being sharp, pointed or piercing), it is obviously not suitable to simply push them into and through two layers of material in the same manner that one would do with an ordinary sharp-pointed straight pin. The use of the blunt-ended pins of this invention requires an entirely new insertion technique. Specifically, the pins of this invention require the use of what will hereinafter be generally referred to as a "pin insertion protector." These pin insertion protectors may be constructed in a number of different ways, but basically their purpose is to form a protective sheath around the pin member until the piercing end of the pin insertion protector and preferably one end of the pin member have been passed completely through all of the layers of material that are to be fastened together. Thereafter the protective sheath is removed from around the pin member so that the pin member can be positioned (will position itself) within the penetrated layers of material.

One of the simplest types of pin insertion protectors 19 is shown in FIGURES 3–7. It is seen to consist of an elongated member (preferably metallic) having one end 20 which is narrow and rather sharply pointed and an opposite end 22 which is considerably wider. The wide end 22 contains a recessed portion 24 which is designed to accommodate at least one of the blunt ends of the previously mentioned blunt-ended pin member. The pointed end 20 should preferably not be so sharp that it will tear the individual threads of the fabric being penetrated, and therefore when cloth is encountered which does tear the end 20 should preferably be rounded to a sufficient extent to avoid undesired tearing.

The pin insertion protector 19 shown in FIGURES 3–7 may be provided with slots (parallel to the axis) along the sides of the back portion so as to divide the back portion into two or more sections (see 22A and 22B of FIGURE 4A) which then will have a slight "give" or flexibility with respect to each other. This resilient action of the rear portion of the pin insertion protector can serve to loosely "grip" the forward end of the pin member 9 inserted within the recessed portion of the pin insertion protector 19.

Figures 5, 6:
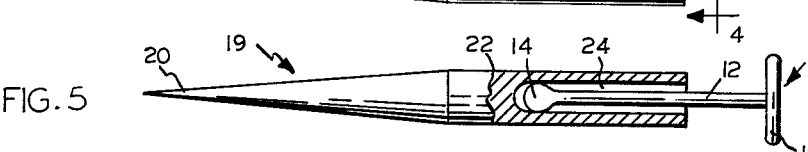
FIGURES 5, 6 and 7 are side views (partly in section) showing the sequential movement of a pin insertion protector and a pin member through two layers of material.
Figures 7, 8, 9:
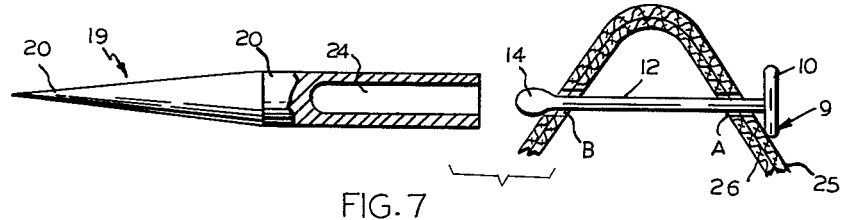
FIGURE 8 is a prespective view of another form of pin insertion protector in accordance with this invention.
FIGURE 9 is a side view of the pin insertion protector of FIGURE 8 with a pin member therein.

In the specific arrangement shown in FIGURE 5 the recessed portion 24 is designed to accommodate the blunted forward end portion 14 and about one-half or more of the shaft portion 12 of the pin member 9. When the pin member 9 is housed in the manner shown by FIGURE 5 the combination of the pin insertion protector 19 and the pin member 9 may be inserted as a unit through two layers of material in the manner indicated by FIGURE 6. The layers of material 25 and 26 may be cloth, paper, plastic, metal foil or any combination of these materials, as noted earlier. As is seen in FIGURE 6 the pointed end 20 of the pin insertion protector 19 first penetrates the two layers of material adjacent the point A and then penetrates the two layers of material adjacent to point B. As the rear (right) end of the pin insertion protector 19 passes through the layers of material at point A the layers of material will, because they usually are composed of reasonably resilient and flexible material, close together around the shaft portion 12. Then, as the pin insertion protector 19 moves to the left in FIGURE 6, the blunted rear end portion 10 of the pin member will come into contact with the layer of material 25 and be stopped by such layer. When the leftward movement of the pin insertion protector 19 is continued beyond the point shown in FIGURE 6 the pin protector 19 and the pin member 9 will slide axially with respect to each other and thereby separate. The end result is as indicated in FIGURE 7 where it will be noted that the two layers of material adjacent point B have closed around the shaft 12 and since the forward blunted end portion 14 has a diameter at least 10% greater (and preferably at least 25% greater) than the diameter of shaft 12 the layers of material will not allow the blunted end portion 14 to pass backward through the layers of material. Thus, when the pin member 9 is in the position shown in FIGURE 7 it effectively functions to fasten the two layers of material 25 and 26 together. Of course, instead of passing through layers 25 and 26 twice as is shown in FIGURES 6 and 7 the pin member 9 could pass through these layers only once and the same result would be achieved, namely the fastening of the two layers of material together. In this regard it should be understood that the drawings are not to scale and that the length of shaft portion 12 can be increased or decreased to suit the particular circumstances or uses encountered. Also, although it might appear that the pin insertion protector might make such a large hole in the layers of material that the blunt end portions of the pin member could slip therethrough, such in fact is not the case with most materials for it has been observed that the penetrated layers quickly tend to return to just about the same position that they occupied prior to penetration due to their inherent resiliency. This is particularly true insofar as textile fabrics and plastic layers are concerned.

A slightly different embodiment of a pin insertion protector is shown in FIGURES 8 and 9. In these figures it will be seen that the recessed portion is in part totally enclosed by the walls (e.g. recess 28) of the pin insertion protector and partially exposed (e.g. recess 29). In FIGURE 9 a pin member 9 is shown resting in such a recessed portion, the forward blunted end 14 of said pin member being within that portion (28) of the recessed section that is totally enclosed by the pin insertion protector and the rear portion of said shaft 12 resting in the recessed portion (29) which is partially exposed. However, the pin insertion protector shown in FIGURES 8 and 9 would function in very much the same way that the pin insertion protector does in FIGURES 3–7, the main difference being the ease with which the pin member could be placed in the pin insertion protector.

FIGURES 12–14 show still another type of pin insertion protector that may be used in connection with the present invention. In these figures it will be seen that the pin insertion protector 30 is essentially in the form of a hollow tubular member that has a pointed end 32 and a recessed portion or cavity 34 extending along the entire length of the elongated members 30. It is attached to a handle H. In FIGURE 12 the pin insertion protector 30 is shown after it has been passed leftwardly through two layers of material 33 and 35. It will be seen that in this position the pin member 36 is housed entirely within the recessed interior of the pin insertion protector. A pin member pusher 38 is shown entering the right end of the pin protector member 30 and abuts the blunted rear end 39 of the pin member 36.

Now, as the pin insertion protector 30 is withdrawn to the right the pin member 36 will remain essentially stationary with respect to the layers of material 33 and 35 by means of pusher 38 and this is because the pusher 38 remains stationary with respect to the layers of material as the pin insertion protector 30 is moved to the right. FIGURE 14 shows the pin member 36 in place in the cloth after the pin insertion protector 30 has been completely withdrawn from the cloth. It will be seen that the pin insertion protector 30 primarily functions to protect the pin member 36 until the pin member is disposed at the desired location with respect to the layers of cloth.

FIGURES 15–17 show a somewhat different type of pin insertion protector wherein the pin member is adapted to be ejected at a point intermediate the ends of the pin insertion protector. Specifically, it will be seen that the pin insertion protector has a forward pointed section 40 and a rear opening 41 through which a pin member can be inserted. An upper intermediate portion of the pin insertion protector is slotted in several places so as to form the upper leaf portions 42 and 43. As is shown in FIGURE 17, a pin member 44 can be ejected from the pin insertion protector into a desired location with respect to two or more layers of material when a pushed bar 45 is passed through the opening 41 so as to simultaneously lift the leaves 42 and 43 and move the pin member 44 in an outward (leftward) direction. After the pin member 44 has been ejected and the pusher bar 45 withdrawn (to the right) the pin insertion protector will revert to the position shown in FIGURE 15.

Figure 26:
Figure 27:

FIGURES 18 and 19 are designed to illustrate that the pin member (made of rubber or soft plastic) can have a blunt end portion 47 that will be in a compressed condition while it is within the recessed portion 48 of the pin insertion protector 49, but upon being emerged from the pin insertion protector the compressed end portion 47 can expand in one or more directions so as to take on a particular shape or configuration or merely an enlarged diameter. FIGURE 26 is a further illustration of the shape a pin member might take while housed in a pin insertion protector and FIGURE 27 illustrates the shape the pin member shown in FIGURE 26 would assume once the pin member had emerged from the pin insertion protector.

Figure 20:
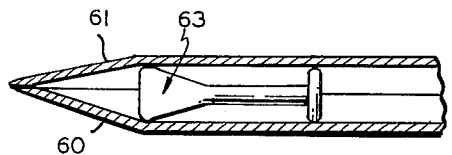
FIGURE 20 is a fragmentary sectional side view and FIGURES 21 and 22 are end views of still another type of pin insertion protector that may be used in accordance with this invention.
Figures 21, 22:
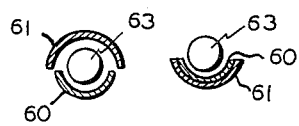

FIGURES 20, 21 and 22 show still another embodiment of a pin insertion protector wherein the pin protector essentially consists of two semi-circular sections 60 and 61. Semi-circular section 60 has a slightly smaller effective diameter than semi-circular section 61 and the reason for this is so that when the pointed end of the pin insertion protector has been inserted through two or more layers of cloth and the pin member 63 contained within the pin insertion protector is positioned at the desired location with respect to the layers of cloth, the two semi-circular sections 60 and 61 can be rotated relative to each other so as to expose the pin member 63. After the pin member 63 has been thus exposed, the nested semi-circular sections 60 and 61 can be withdrawn from the layers of cloth leaving the pin member 63 in the desired location in the cloth (e.g. in the position shown in FIGURES 7 and 14).

Figure 31:
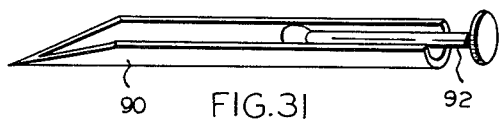
FIGURE 31 illustrates an open top pin insertion protector in accordance with this invention.

FIGURE 31 shows another embodiment of a pin insertion protector which essentially consists of a U-shaped channel section 90 having a pointed forward end. A pin member 92 is shown in the back of section 90. Such a protector can be removed from cloth in either a forward or backward direction.

Figure 23:
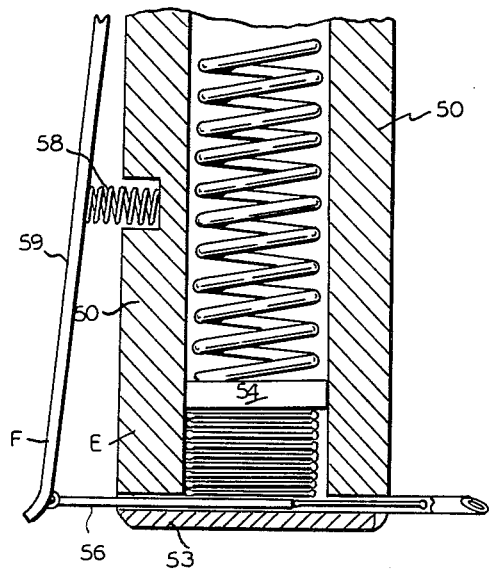
FIGURE 23 is a view of a magazine feed arrangement for a pin insertion protector and a plurality of pin members in accordance with this invention.

FIGURE 23 illustrates a mechanism whereby the pin members in accordance with this invention could be dispensed and used in a manner somewhat analogous to the manner in which staples are dispensed. In this figure a housing 50 is seen to contain a plurality of pin members 51 which may be fed toward the outlet end 53 of housing 50 in any known way, for instance under pressure by a spring loaded feeder member 54. As the pin members 51 are pushed toward the outlet end 53, they will sequentially come into alignment with outlet opening 55. Also aligned with this opening is plunger 56 which can be moved in the direction of arrow E by manual pressure upon arm 59 and which preferably then returns in the direction of arrow F by means of spring 58. When plunger 56 is pressed in the direction of arrow E, a pin member 51 will be displaced outwardly (to the right) through outlet 55. After the pin member 51 passes through outlet 55 it then passes into a pin insertion protector 57 that is both aligned with the outlet 55 and attached to the exterior of housing 50. Protector 57 can be constructed on almost exactly the same lines as the protector 30 shown in FIGURES 12–14 (plunger 56 performing the same function as pusher 30).

(In order to conserve space in the drawings, the plunger 56 in FIGURE 23 has been shown as considerably shorter than it actually needs to be, but it will be obvious that plunger 56 must be long enough to extend to the outer end of arm 60 when pressed to its innermost position.)

Figure 24:
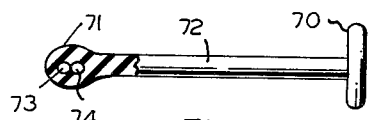
FIGURES 24-27 are side views, partly in section, of other embodiments of pin members in accordance with this invention.
Figure 25:
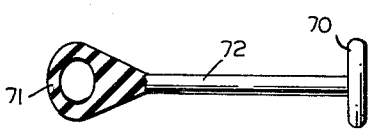

In accordance with another embodiment of this invention I may use a pin member having an end which is adapted to increase considerably in size shortly prior to or after it emerges from the pin insertion protector. There are a number of ways in which such a pin member might be made, one way being illustrated in FIGURES 24 and 25. FIGURE 24 shows a pin member having two enlarged blunt ends 70 and 71 and an intermediate shaft portion 72. If one end, such as end 71 contains two encapsulated increments of liquid chemicals 73 and 74 that when intermixed will interact to produce a reaction product that will occupy a volume greater than the additive volumes of encapsulated chemicals 73 and 74, then if said capsules are broken either while the pin member is in the protector, or shortly thereafter, the result will be that the end 71 will swell or increase in volume, for example to the extent indicated in FIGURE 25. The reaction product should of course "set" quickly. Instead of two capsules a single capsule could be used. For instance if the pin member was made of rubber and the capsule contained a hydrocarbon solvent, this would cause the surrounding rubber to swell when the capsule was broken. Alternatively, a pin member made of rubber could have one end dipped in a hydrocarbon solvent shortly before the pin member was put in the protector so that after the pin member emerged from the protector it would swell. Those skilled in the chemical arts could readily select two or more chemicals that could be separately encapsulated and which when ruptured would interact with each other to produce a reaction product occupying a greater volume than the reactants (e.g. bisphenol, epichlorohydrin and a peroxy catalyst; expandable polystyrene; etc.).

Figure 28:
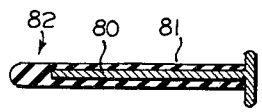
FIGURES 28-30 are side views, partly in section, of another pin member in accordance with this invention.
Figure 29:
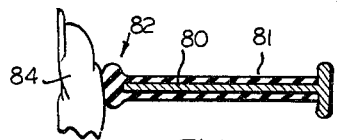
Figure 30:
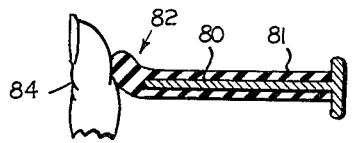

Another alternative embodiment of my invention is shown in FIGURES 28, 29 and 30. In these figures a metallic pin 60 (perferably having no point) having a shank diameter of only a few thousandths of an inch is coated with a rubber or soft plastic material 81 which increases the diameter by a few thousandths of an inch. As shown, a substantial amount of the rubber or soft plastic material 82 is located forward of the left end of the metallic pin 80, the purpose of this being to protect a finger 84 (for example) when the device was pressed thereagainst. In other words, when this device is pressed against one's finger the rubber or plastic on the end will either compress to form a sort of resilient bumper (FIGURE 29) or will bend to the side slightly (FIGURE 30). As a specific example of this type of device it is contemplated that the metal pin could have a diameter of .010 inch coated with a .003 film of rubber or plastic. This product would not be larger than the ordinary pin (.024 inch), and would not make a hole in the cloth larger than an ordinary pin would. The end portion 82 made of rubber or resilient plastic can have the same diameter as the rest of the shaft of the device or it can be at least 10% greater in diameter, depending upon the particular use to which the device is to be put.

In conclusion, while the foregoing specification and drawing describe the construction, operation and use of several preferred embodiments of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all changes, variations, modifications and equivalents falling within the scope of the appended claims.

What is claimed is:

1. A device for fastening at least two sheets of flexible material together comprising in combination:
   (A) a blunt-ended pin member which comprises:
      (a) a longitudinal shaft portion,
      (b) a blunt forward end portion located at one end of said shaft portion,
      (c) a blunt rear end portion located at the other end of said shaft portion,
      (d) said blunt rear end portion having a maximum diameter which is more than 10% larger than the minimum diameter of said shaft portion,
   (B) a least one of said blunt end portions being temporarily housed within a pin insertion protector,
   (C) said pin insertion protector comprising:
      (a) an elongated member having a recessed portion that is large enough to receive at least one end of said blunt-ended pin member,
      (b) the forward end of said elongated member being pointed so that it can penetrate sheets of flexible material with relatively little resistance,
   (D) said blunt-ended pin member being axially slideable within said recessed portion of said pin insertion protector.

2. A device according to claim 1 wherein said pin member is made of rubber.

3. A device according to claim 1 wherein the said forward end of said pin insertion protector consists of a solid pointed portion.

4. A device according to claim 1 wherein said recessed portion of said pin insertion protector is adapted to loosely grip the forward end of the said pin member.

5. A device according to claim 1 wherein said pin insertion protector is essentially in the form of a hollow tubular member.

6. A device according to claim 1 wherein said pin insertion protector has a forward pointed section, a rear opening through which the pin member can be inserted, and a slotted upper intermediate portion which permits ejection of the pin member.

7. A device according to claim 1 wherein said pin insertion protector consists of two semi-circular sections, one of which is of slightly smaller diameter than the other, so that the sections can be rotated relative to each other.

8. A device according to claim 1 wherein said pin insertion protector essentially consists of a U-shaped channel section having a pointed forward end.

9. A device according to claim 1 wherein said pin member is made of flexible plastic material.

10. A device according to claim 9 wherein the blunt forward end portion of said pin member is more than 10% larger than the minimum diameter of the shaft of the pin member.

11. A device according to claim 9 wherein the blunt forward end portion of said pin member is more than 25% larger than the minimum diameter of the shaft of the pin member.

12. A device according to claim 1 wherein said pin member comprises an elongated metallic member having a head portion and a shank portion, said shank portion being covered with a thin film of resilient material that extends beyond that end of the shaft of the elongated metallic member which is farthest from said head portion.

13. A device according to claim 12 wherein said resilient material is soft plastic.

References Cited by the Examiner

UNITED STATES PATENTS

| | | | |
|---|---|---|---|
| 683,655 | 10/01 | Mersch | 24—90 |
| 1,272,674 | 7/18 | Keller | 24—90 |
| 1,956,594 | 5/34 | Rindskopf | 24—90 |
| 2,213,715 | 9/40 | Monahan | 24—90 |
| 2,705,098 | 3/55 | Sipler | 223—102 |

FOREIGN PATENTS 394,334  6/33  Great Britain.

WILLIAM FELDMAN, *Primary Examiner.*

BOBBY R. GAY, *Examiner.*